Patented Dec. 27, 1932

1,892,258

UNITED STATES PATENT OFFICE

HANNS UFER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF MODIFIED CASTOR OIL

No Drawing. Application filed January 17, 1930, Serial No. 421,596, and in Germany August 15, 1928.

Application has been filed in Germany, August 15, 1928.

The present invention relates to the production of modified castor oil.

I have found that castor oil can be modified in order to render it soluble in mineral oils in a particularly advantageous manner by heating castor oil in the presence of small quantities of acid compounds of the non-oxidizing mineral acids containing oxygen, preferably while avoiding the presence of water. Acid compounds of the aforesaid nature are for example the mineral acids corresponding to the aforesaid definition, such as phosphoric acid, sulphuric acid, sulphonic acids of aromatic hydrocarbons, for example the naphthalene sulphonic acids, acid esters and acid salts of the aforesaid mineral acids, such as acid esters of phosphoric acid with butyl alcohol or cresol, sodium acid sulphate and the like or mixtures of the aforesaid compounds. It is to be understood that the term "acid compounds" does not include salts which with water show an acid reaction, but only such acid salts in which the quantity of acid present is higher than the quantity equivalent to that of the base of the said salts. According to the above definition nitric acid does not come into consideration as being inoperative, since it attacks the oils under treatment.

The quantity employed of the acid substances should generally not exceed several per cent by weight of the oil under treatment and in most cases a few per thousand are sufficient. In any case the present process is absolutely different from the esterification of castor oil with sulphuric acid which effect is desired in the production of the so-called Turkey-red oil in which process the quantity of sulphuric acid for example is at least equimolecular to the quantity of oil employed, so that the mineral acid reacts with the oil to form a sulphuric ester thereof or a sulphonic acid. In the process according to the present invention any ester or other intermediate combination product of the oil with the mineral acid are apparently decomposed during the process even when a reaction of the aforesaid nature should occur between the oil and the mineral acid employed.

The process according to the present invention may be carried out either by heating castor oil as such or a mixture thereof with a mineral oil, in the liquid phase with a catalyst of the aforesaid kind which is dispersed therein, or by causing the castor oil or the said mixture to flow over the heated catalyst, when a solid catalyst is employed. In the former case care should be taken that there is a good contact between the catalyst and the oil by employing the former in a finely divided state. It is frequently suitable, however, to employ the catalyst only so finely divided that it may be separated again from the oil obtained in a simple manner for example by allowing it to settle, by centrifuging or filtration.

Instead of mixing the oil obtainable by the process in accordance with the present invention with mineral oil it is frequently preferable to mix the crude castor oil with the mineral oil and to subject the mixture thus obtained to the treatment with the catalyst which splits off water.

For the manufacture and production of the castor oils which are miscible with mineral oils care should be taken to employ constructional material for the apparatus which will have no unfavorable influence on the process or which will alter the oil, for example render it dark-coloured, as it may occur with iron apparatus especially at more elevated temperatures and with oils containing large amounts of acid. Such objections may be obviated in the manner already known by the usual methods such as appropriate coatings, linings and the like, for example by enamelling, tinning, lining with chromium-nickel steel, or by appropriate choice of the constructional material for the apparatus or both.

The temperature employed is above the boiling point of water at atmospheric pressure and easily volatile reaction products, such as water are evaporated during the process. The working conditions, such as the reaction temperature and the duration of the heating, are dependent on the catalyst employed and on the desired properties of the oil to be prepared by the process. Generally speaking the reaction temperature lies between about 150° and 350° centigrade, especially between 200° and 260° centigrade, and the duration of the reaction is usually between several minutes and several hours. Generally speaking it may be stated that the castor oil becomes miscible with practically any mineral oil of any origin as soon as one molecular proportion of water has been evaporated per each molecular proportion of castor oil. By further proceeding with the heating operation further quantities of water are removed and the product is then still miscible with mineral oils but acquires the valuable property of drying in the air which property is not inherent with castor oil. By particularly regulating the conditions of working for example by extending the period of working, or by working at a rather high temperature, say at from 230° to 260° centigrade, depending on the nature of the acid reacting compound chosen, almost 3 molecular proportions of water can be removed per each molecular proportion of castor oil without any considerable decomposition of the castor oil. The products obtainable by working under such strong conditions are miscible with mineral oils and show drying properties resembling those of linseed oil or tung oil. The aforedescribed reaction takes place in contrast to any expectation since, generally, castor oil is decomposed by heating with the production of œnanthol and undecyclic acid which deleterious effect does not occur on working in accordance with the present invention, the particular catalysts employed apparently avoiding a decomposition of the triglyceride of castor oil and promoting solely the removal of water in a quantity increasing with the generation of drying products. The aforesaid castor oil with drying properties can be favourably employed in the place of linseed oil or tung oil, or in mixture with these or similar oils, and may find useful application in the production of paints or other coating materials and in the manufacture of drying artificial resins, for example from polybasic carboxylic acid and polyhydric alcohols in mixture with an oil prepared according to the present invention. The drying properties of the castor oil are, however, not desired when the modified castor oil is intended as addition to mineral oils for the production of lubricating oils, so that in this case the process of heating according to the present invention is performed only so far that the castor oil becomes miscible with a mineral oil, a further removal of water being avoided.

The process according to the present invention may be carried out by different modifications of working. Thus for example the castor oil may be heated together with the acid substance chosen, preferably while stirring and applying a vacuum or while passing a current of a volatilized non-oxidizing agent, such as a gas or vapour, through the reaction vessel, both these modifications providing a quick removal of the easily volatile constituents formed during the process. Another modification consists in allowing a mixture of the castor oil with the acid substance to flow down in a tower or like reaction vessel, preferably filled with inert filler bodies such as the well known Raschig rings or similar bodies; in this process the oil to be modified may be pumped in a cycle through the tower or similar device. On the other hand the tower or similar device may be fed with the acid substance which may be deposited on any desired filler body and the oil may be passed while heating, and if desired in a cycle, through the said reaction vessel.

The acid value of the modified castor oils obtainable in accordance with the present invention may vary within wide limits and highly valuable oils with an acid value which is practically zero may be obtained. For example by working at from 200° to 270° centigrade while passing through a non-oxidizing gas or in a vacuum or by distilling off the volatile constituents after a reaction directly from the hot reaction product at about 190° to 210° centigrade, oils are obtained with an acid value below 5, for example from 1 to 4.

The following examples illustrate how the process according to the present invention may be carried out in practice but the invention is not restricted to these examples.

*Example 1*

A first quality castor oil is incorporated with about 0.4 per cent its weight of pulverized dry sodium acid sulphate and the mixture is heated, while stirring and evacuating the reaction vessel, at a temperature of 200° to 250° centigrade. Gradually increasing quantities of water and small quantities of other easily volatile constituents are distilled off and the miscibility of the castor oil increases with the increase of the quantities distilled off. As soon as from 2 to 3 per cent by weight of the oil of water have been distilled off which effect requires heating for about one hour at from 240° to 250° centigrade the castor oil is miscible with practically any mineral oil even at very low temperatures and it may find useful application as an addition to mineral lubricatng oils.

By further proceeding with heating the oil is gradually rendered similar to linseed oil as regards its drying properties and can be employed instead of or in combination with drying oils for all the purposes in which drying oils are employed in the art. Depending on the desired purpose of application the process of heating is stopped and the oil is separated from the acid reacting substance added by filtration, an oil showing an acid value of about 2 being obtained in a very good yield.

Similar results can be obtained with a castor oil of a lower quality, such as is obtained by the second pressing operation of castor beans, and/or by substituting other acid compounds according to the present invention, such as beta-naphthalene sulphonic acid, phosphoric monobutyl ester and the like for the sodium acid sulphate.

*Example 2*

Castor oil having an acid value of 10.7 is incorporated with 0.3 per cent its weight of phosphoric acid and the mixture is heated to 220° to 250° centigrade while stirring and while passing through nitrogen or carbon dioxide, or while evacuating the reaction vessel. After from 3 to 4 per cent by weight of the oil of easily volatile constituents have been removed the oil is miscible with practically any mineral oil. When the heating process is further proceeded with, almost 3 molecular proportions of water can be removed per each molecular proportion of castor oil and the product obtained is not only miscible with mineral oils, but it possesses also drying properties and can be employed in the place of/or in combination with the well known drying oils of vegetable origin. In order to remove phosphoric acid from the product the reaction mixture is cooled to from 50 to 70° centigrade, incorporated with about 1 per cent its weight of calcium carbonate, ½ per cent by weight of finely divided solid absorbing substance, such as asbestos, fuller's earth, active carbon, charcoal and the like, being further added, if desired, and stirred for ½ hour at the aforesaid temperature, whereupon the solid constituents are separated for example by filtration. The oil obtained is thoroughly transparent, miscible with mineral oils and shows an acid value of 1 to 5. Similar good results are obtained when the phosphoric acid is replaced by sulphuric acid but in this case the temperature of working should not exceed 160° centigrade if a discolouration of the oil under treatment is to be avoided.

*Example 3*

200 kilograms of a mineral oil or spindle oil containing none or inconsiderable quantities of fractions boiling below 250° centigrade are mixed with from 20 to 50 kilograms of castor oil and 1 kilogram of phosphoric acid whereupon the mixture is heated while stirring either in a vessel connected with an evacuating device or while carbon dioxide or nitrogen is being passed through the mixture, or while applying a vacuum and passing through one of the said inert gases, to a temperature of about 230° C. until a sample removed from the reaction vessel and neutralized with carbonate of calcium remains transparent after filtering off calcium phosphate and cooling. The reaction mixture is then cooled to a temperature between 70° and 80° centigrade, stirred with 1.5 kilograms of calcium carbonate and then filtered from calcium phosphate formed or separated therefrom by settling. A mixed oil having valuable lubricating properties is obtained from which even after prolonged standing and cooling no castor oil separates out.

The present application is a continuation in part of the application Ser. No. 378,586, filed July 15th, 1929.

What I claim is:—

1. The process for the production of modified castor oil which comprises heating castor oil in the presence of a quantity not exceeding a few per cent by weight of the oil of an acid compound of the non-oxidizing mineral acids containing oxygen, but in the absence of a substantial quantity of an oxidizing agent.

2. The process for the production of modified castor oil which comprises heating castor oil in the presence of a quantity not exceeding a few per cent by weight of the oil of an acid compound of the non-oxidizing mineral acids containing oxygen, but in the absence of a substantial quantity of an oxidizing agent while removing the easily volatile reaction products.

3. The process for the production of modified castor oil which comprises heating castor oil in the presence of a quantity not exceeding a few per cent by weight of the oil of an acid compound of the non-oxidizing mineral acids containing oxygen, but in the absence of a substantial quantity of an oxidizing agent, while passing a current of a non-oxidizing gaseous agent through the reaction mixture.

4. The process for the production of modified castor oil which comprises heating a mixture of castor oil and a mineral oil in the presence of a quantity not exceeding a few per cent by weight of the oil of an acid compound of the non-oxidizing mineral acids containing oxygen, but in the absence of a substantial quantity of an oxidizing agent.

5. The process for the production of modified castor oil which comprises heating a mixture of castor oil and a mineral oil in the presence of a quantity not exceeding a few per cent by weight of the oil of an acid compound of the non-oxidizing mineral acids containing oxygen, but in the absence of a substantial quantity of an oxidizing agent, while removing the easily volatile reaction products.

6. The process for the production of modified castor oil which comprises heating castor oil to a temperature between about 150° and 350° centigrade in the presence of a quantity not exceeding a few per cent by weight of the oil of an acid compound of the non-oxidizing mineral acids containing oxygen, but in the absence of a substantial quantity of an oxidizing agent.

7. The process for the production of modified castor oil which comprises heating a mixture of castor oil and a mineral oil to a temperature between about 200° and 260° centigrade in the presence of a quantity not exceeding a few per cent by weight of the oil of an acid compound of the non-oxidizing mineral acids containing oxygen, but in the absence of a substantial quantity of an oxidizing agent, while removing the easily volatile reaction products.

8. The process for the production of modified castor oil which comprises heating castor oil in the presence of a quantity not exceeding a few per cent by weight of the oil of phosphoric acid, but in the absence of a substantial quantity of an oxidizing agent.

9. The process for the production of modified castor oil which comprises heating castor oil in the presence of a quantity not exceeding a few per cent by weight of the oil of phosphoric acid, but in the absence of a substantial quantity of an oxidizing agent, while passing a current of a non-oxidizing gaseous agent through the reaction mixture.

10. The process for the production of modified castor oil which comprises heating a mixture of castor oil and a mineral oil in the presence of a quantity not exceeding a few percent by weight of the oil of phosphoric acid, but in the absence of a substantial quantity of an oxidizing agent.

11. The process for the production of modified castor oil which comprises heating castor oil to a temperature between about 200° and 260° centigrade in the presence of a quantity not exceeding a few per cent by weight of the oil of phosphoric acid, but in the absence of a substantial quantity of an oxidizing agent.

12. The process for the production of modified castor oil which comprises heating castor oil in the presence of a quantity not exceeding a few per cent by weight of the oil of an acid compound of the non-oxidizing mineral acids containing oxygen, but in the absence of a substantial quantity of an oxidizing agent, until at least 2 per cent, by weight of the oil, of water has been removed therefrom.

13. The process for the production of modified castor oil which comprises heating castor oil to a temperature between about 200° and 260° centigrade in the presence of a quantity not exceeding a few per cent by weight of the oil of an acid compound of the non-oxidizing mineral acids containing oxygen, but in the absence of a substantial quantity of oxidizing agent, until at least 2 per cent, by weight of the oil, of water has been removed therefrom.

14. The process for the production of modified castor oil which comprises heating castor oil to a temperature between about 200° and 260° centigrade in the presence of a quantity not exceeding a few per cent by weight of the oil of phosphoric acid, but in the absence of a substantial quantity of an oxidizing agent, until at least 2 per cent, by weight of the oil, of water has been removed therefrom.

In testimony whereof I have hereunto set my hand.

HANNS UFER.